United States Patent
Seo et al.

(10) Patent No.: US 12,494,960 B2
(45) Date of Patent: Dec. 9, 2025

(54) QAM DEMODULATOR HAVING RECURSIVE STRUCTURE

(71) Applicant: SAMSUNG ELECTRONICS CO., LTD., Suwon-si (KR)

(72) Inventors: Junyeong Seo, Suwon-si (KR); Jooyeol Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 15 days.

(21) Appl. No.: 18/474,763

(22) Filed: Sep. 26, 2023

(65) Prior Publication Data

US 2024/0113929 A1    Apr. 4, 2024

(30) Foreign Application Priority Data

Sep. 28, 2022   (KR) .................. 10-2022-0123485
Feb. 1, 2023    (KR) .................. 10-2023-0013880

(51) Int. Cl.
*H04L 27/38* (2006.01)
*H04L 25/06* (2006.01)
(Continued)

(52) U.S. Cl.
CPC ............ *H04L 27/38* (2013.01); *H04L 25/067* (2013.01); *H04L 27/06* (2013.01); *H04L 27/2649* (2013.01)

(58) Field of Classification Search
CPC ... H04L 27/38; H04L 25/067; H04L 27/2649; H04L 27/06
(Continued)

(56) References Cited

U.S. PATENT DOCUMENTS 6,137,545 A    10/2000  Patel et al.
6,594,318 B1 *  7/2003  Sindhushayana ...........................
                                          H03M 13/2957
                                                 375/280

(Continued)

FOREIGN PATENT DOCUMENTS

JP    2022114026    8/2022
KR    10-1093946   12/2011

OTHER PUBLICATIONS

Extended European Search Report dated Feb. 19, 2024 in related European Patent Application No. 23200418.4 (9 pages).

*Primary Examiner* — Leila Malek
(74) *Attorney, Agent, or Firm* — Morgan , Lewis & Bockius LLP

(57) ABSTRACT

A QAM demodulator including a first calculation circuit including a real part returning circuit and an imaginary part returning circuit that derive, from a first complex symbol, an in phase (I) component and a quadrature phase (Q) component, respectively; first and second comparators for receiving the I and Q components, and based thereon, outputting respective bits of a bit string; first and second absolute value returning circuits that derive absolute values of the I and Q components ("abs(I)" and "abs(Q)"); first and second summers to sum each of abs(I) and abs(Q) with a first reference value and thereby provide first and second summed outputs; and a sub-QAM demodulator configured to QAM demodulate a second complex symbol and thereby output corresponding bits. I and Q components of the second complex symbol are based on the first and second summed outputs. The corresponding bits are remaining bits of the bit stream.

20 Claims, 15 Drawing Sheets

(51) Int. Cl.
   *H04L 27/06* (2006.01)
   *H04L 27/26* (2006.01)
(58) Field of Classification Search
   USPC .......................................................... 375/261
   See application file for complete search history.

(56) References Cited

U.S. PATENT DOCUMENTS

| | | | |
|---|---|---|---|
| 7,076,000 B2 * | 7/2006 | Rodriguez | H04L 1/005 |
| | | | 714/780 |
| 7,881,394 B2 | 2/2011 | Sindhushayana | |
| 8,213,552 B2 | 7/2012 | Bui et al. | |
| 9,143,210 B1 | 9/2015 | Lee et al. | |
| 9,634,879 B2 | 4/2017 | Miyazaki | |
| 10,038,587 B2 | 7/2018 | Sandell et al. | |
| 10,355,908 B1 | 7/2019 | Peyla et al. | |
| 2003/0102905 A1 | 6/2003 | Ha et al. | |
| 2003/0138054 A1 | 7/2003 | Ha et al. | |
| 2008/0063102 A1 * | 3/2008 | Okunev | H04L 27/3836 |
| | | | 375/261 |
| 2020/0389348 A1 | 12/2020 | Limberg | |
| 2022/0085914 A1 | 3/2022 | Yu et al. | |

\* cited by examiner

FIG. 5B

| Modulation order | #of reference values | #of comparators |
|---|---|---|
| 64QAM | 4 | 8 |
| 256QAM | 8 | 16 |
| 1024QAM | 16 | 32 |
| 4kQAM | 32 | 64 |
| 16kQAM | 64 | 128 |

FIG. 6

| Modulation order | $A_0$ | $A_1$ | $A_2$ | $A_3$ |
|---|---|---|---|---|
| QPSK | 1 | 1 | 1 | 1 |
| 16QAM | 2 | 1 | 1 | 1 |
| 64QAM | 4 | 2 | 1 | 1 |
| 256QAM | 8 | 4 | 2 | 1 |
| 1024QAM | 16 | 8 | 4 | 2 |

FIG. 10

| Modulation order | EXISTING DECISION BOUNDARY METHOD | | $2^{2(N-1)}$ QAM+1 stage sequential operation | | | Fully sequential operation | | |
|---|---|---|---|---|---|---|---|---|
| | THE NUMBER OF REFERENCE VALUES | THE NUMBER OF COMPARATORS | THE NUMBER OF REFERENCE VALUES | THE NUMBER OF SUMMERS | THE NUMBER OF COMPARATORS | THE NUMBER OF REFERENCE VALUES | THE NUMBER OF SUMMERS | THE NUMBER OF COMPARATORS |
| 64QAM | 4 | 8 | 3 | 2 | 6 | 3 | 4 | 6 |
| 256QAM | 8 | 16 | 5 | 2 | 10 | 4 | 6 | 8 |
| 1024QAM | 16 | 32 | 9 | 2 | 18 | 5 | 8 | 10 |
| 4K QAM | 32 | 64 | 17 | 2 | 34 | 6 | 10 | 12 |
| 16K QAM | 64 | 128 | 33 | 2 | 66 | 7 | 12 | 14 |
| ⋮ | ⋮ | ⋮ | ⋮ | ⋮ | ⋮ | ⋮ | ⋮ | ⋮ |
| $2^N$ QAM | $2^{N-1}$ | $2^N$ | $2^{N-2}+1$ | 2 | $2^{N-1}+2$ | N | 2(N−1) | 2N |

QAM DEMODULATOR HAVING RECURSIVE STRUCTURE

CROSS-REFERENCE TO RELATED APPLICATION(S)

This application is based on and claims priority under 35 U.S.C. § 119 to Korean Patent Application Nos. 10-2022-0123485, filed on Sep. 28, 2022, and 10-2023-0013880, filed on Feb. 1, 2023, in the Korean Intellectual Property Office, the disclosures of which are incorporated by reference herein in their entireties.

TECHNICAL FIELD

This disclosure relates to a Quadrature Amplitude Modulation (QAM) demodulator and more particularly to a Multiple-Input and Multiple-Output (MIMO) detection electronic device including a QAM demodulator.

DISCUSSION OF RELATED ART

A wireless communication system may employ various techniques to increase throughput, such as QAM type modulation and demodulation. With QAM, each symbol of a transmitted symbol stream represents a bit string of a plurality of bits, and with higher orders of QAM, each symbol represents a relatively longer bit stream.

For example, a wireless communication system may employ MIMO, which uses a plurality of antennas to increase communication capacity. As techniques for increasing throughput are adopted, the transmitting side may transmit a signal having high complexity such as a high order QAM signal, while the receiving side may be required to process such a transmitted signal having high complexity. For example, with 1024 QAM, each symbol represents a 10-bit string; for 4K QAM, each symbol represents a 12-bit string; and so forth. It would be desirable to provide circuitry for demodulating such signals without excessive hardware complexity and power consumption.

SUMMARY

Embodiments of the inventive concept provide a Multiple-Input and Multiple-Output (MIMO) detector that reduces hardware complexity and reduces power consumption even in a high modulation order, based on a Quadrature Amplitude Modulation (QAM) demodulator having a recursive structure using constellation characteristics; and an electronic device including the same.

According to an aspect of the inventive concept, there is provided a QAM demodulator including a first calculation circuit including a real part returning circuit and an imaginary part returning circuit configured to derive, from a first complex symbol, an in phase (I) component and a quadrature phase (Q) component, respectively; a first comparator and a second comparator for receiving the I and Q components, respectively, and based thereon, outputting respective bits of a bit string; a first absolute value returning circuit configured to derive an absolute value of the I component "abs(I)"; a second absolute value returning circuit configured to derive an absolute value of the Q component "abs(Q)"; a first summer configured to sum abs(I) and a first reference value and thereby provide a first summed output; a second summer configured to sum abs(Q) and the first reference value and thereby provide a second summed output; and a sub-QAM demodulator configured to QAM demodulate a second complex symbol and thereby output corresponding bits. An I component of the second complex symbol is based on the first summed output and a Q component of the second complex symbol is based on the second summed output, and the corresponding bits are remaining bits of the bit stream.

According to another aspect of the inventive concept, there is provided a QAM demodulator including a most significant bit calculation circuit, including a real part returning circuit and an imaginary part returning circuit that receive complex symbols, respectively, a real number comparator and an imaginary number comparator, and a plurality of calculation circuits connected in series with each other, wherein each of the plurality of calculation circuits includes a first absolute value returning circuit, a first summer, and a first comparator for sequentially outputting bits of an in-phase component except for the most significant bit of a bit string corresponding to the complex symbol, and a second absolute value returning circuit, a second summer, and a second comparator for sequentially outputting bits of a quadrature phase component except for the most significant bit of the bit string corresponding to the complex symbol.

According to another aspect of the inventive concept, there is provided a MIMO detector including a plurality of soft decision calculation circuits, wherein each of the plurality of soft decision calculation circuits includes hard decision circuits, wherein each of the hard decision circuits includes a real part returning circuit and an imaginary part returning circuit for receiving complex symbols, respectively, a first calculation circuit including a first comparator and a second comparator, a first absolute value returning circuit for receiving an output value of the real part returning circuit, a second absolute value returning circuit for receiving an output value of the imaginary part returning circuit, a first summer based on the output of the first absolute value returning circuit and a first reference value, a second summer based on the output of the second absolute value returning circuit and the first reference value, and a sub-hard decision circuit receiving an output of the first summer and an output of the second summer.

BRIEF DESCRIPTION OF THE DRAWINGS

Embodiments will be more clearly understood from the following detailed description taken in conjunction with the accompanying drawings in which:

FIG. 5B is a table showing the number of comparators and reference values required for each hard detector according to a comparative example;

FIG. 6 shows an example of reference values according to embodiments of the inventive concept;

FIG. 10 is a table showing a comparison of the number of comparators, reference values, and summers according to an embodiment and an implementation example of a hard detector according to an embodiment.

DETAILED DESCRIPTION OF EMBODIMENTS

Hereinafter, embodiments of the inventive concept will be described in detail with reference to the accompanying drawings.

Figure 1:
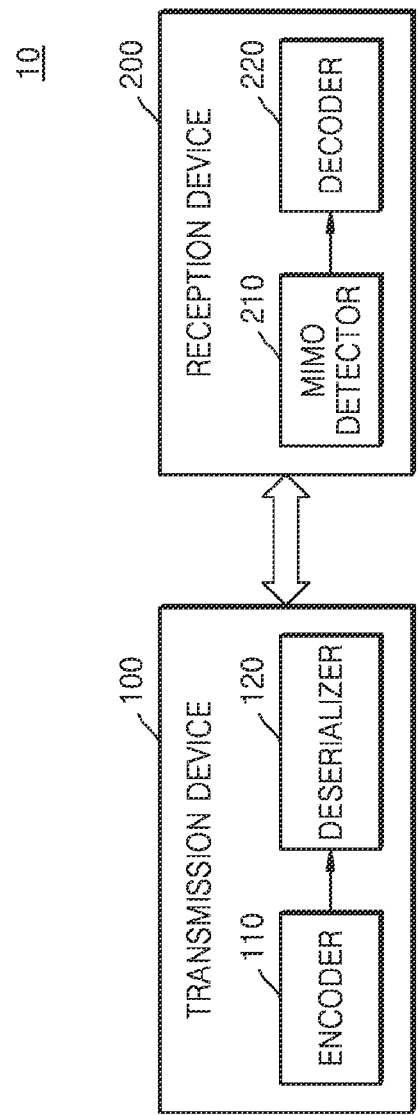
FIG. 1 illustrates a wireless communication system according to an embodiment.

FIG. 1 illustrates a wireless communication system according to an embodiment.

Referring to FIG. 1, a wireless communication system 10 may include a transmission device 100 and a reception device 200. The transmission device 100 may be a device for encoding data and transmitting a signal through a wireless channel. For example, when the signal is an uplink signal, the transmission device 100 may correspond to user equipment (UE) and the reception device 200 may correspond to a base station. In another example, when the signal is a downlink signal, the transmission device 100 may correspond to a base station and the reception device 200 may correspond to UE.

The transmission device 100 may include an encoder 110 and a deserializer 120. The encoder 110 may encode data according to various encoding techniques. For example, the encoder 110 may perform encoding based on at least one of a turbo code, a convolution code, and a polar code. The deserializer 120 may parallelize a serial bit string. The deserializer 120 may receive a bit string of codewords encoded from the encoder 110 and parallelize the serial bit string as many times as the number of multiple inputs. For example, the deserializer 120 may parallelize the serial bit string and map the parallelized serial bit string to each of a plurality of layers (independent data streams). The plurality of layers may correspond to each rank of Multiple Input Multiple Output (MIMO). For example, in an embodiment in which the wireless communication system 10 is a 4×4 MIMO wireless communication system, the serial bit string may be parallelized into 4 bit strings.

The reception device 200 may include a MIMO detector 210 and a decoder 220. The MIMO detector 210 may detect a MIMO signal. The MIMO detector 210 may generate soft decision information in the process of detecting the MIMO signal to perform error correction through the decoder 220. For example, the MIMO detector 210 may employ a linear detection technique using Minimum Mean Squared Error (MMSE), Zero-Forcing (ZF), and Matched Filter (MF), and/or may employ a non-linear detection technique applying maximum likelihood (ML).

Figure 2:
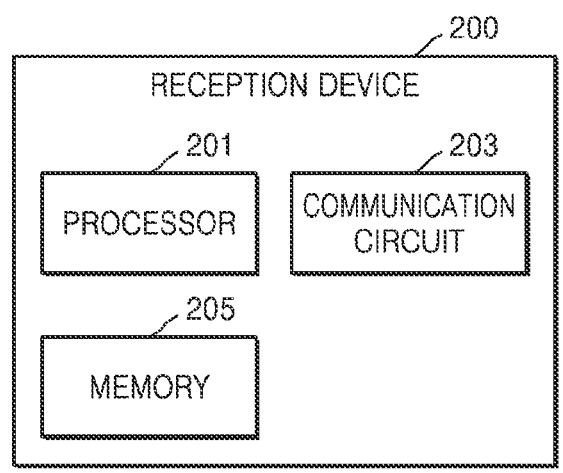
FIG. 2 is a block diagram of a reception device according to embodiments of the inventive concept.

FIG. 2 is a block diagram of a reception device 200 according to embodiments of the inventive concept.

Referring to FIG. 2, the reception device 200 may include a processor 201, a communication circuit 203, and a memory 205.

The processor 201 may control the overall operation of the reception device 200. For example, the processor 201 may transmit signals to an external device and receive signals from the external device via the communication circuitry 203. Also, the processor 201 may write data to and read data from the memory 205. A portion of the communication circuit 203 and the processor 201 may be referred to as a communication processor (CP).

The communication circuit 203 performs functions for transmitting and receiving signals through a radio channel. For example, the communication circuit 203 performs a conversion function between a baseband signal and a bit string according to the physical layer standard of a system. For example, when transmitting data, the communication circuit 203 may generate complex symbols by encoding and modulating a transmission bit string, and when receiving data, the communication circuit 203 may restore the received bit string by demodulating and decoding the baseband signal. In addition, the communication circuit 203 may up-convert a baseband signal into an RF band signal and transmit the signal through an antenna, or down-convert an RF band signal received through an antenna into a baseband signal. For example, the communication circuit 203 may include transmit filters, receive filters, amplifiers, mixers, oscillators, Digital-to-Analog Converters (DACs), Analog-to-Digital Converters (ADCs), and the like. The communication circuit 203 may perform beamforming. The communication circuit 203 may apply beamforming weights to signals to give directionality to signals to be transmitted and received. According to an embodiment, the communication circuit 203 may receive the spatially multiplexed MIMO signal through the MIMO detector 210 and obtain an error-corrected bit string through the decoder 220.

The memory 205 may store data such as a basic program for operating the reception device 200, an application program, and setting information. The memory 205 may include volatile memory, non-volatile memory, or a combination of volatile and non-volatile memory. The memory 205 may provide stored data according to a request of the processor 201.

Figure 3:
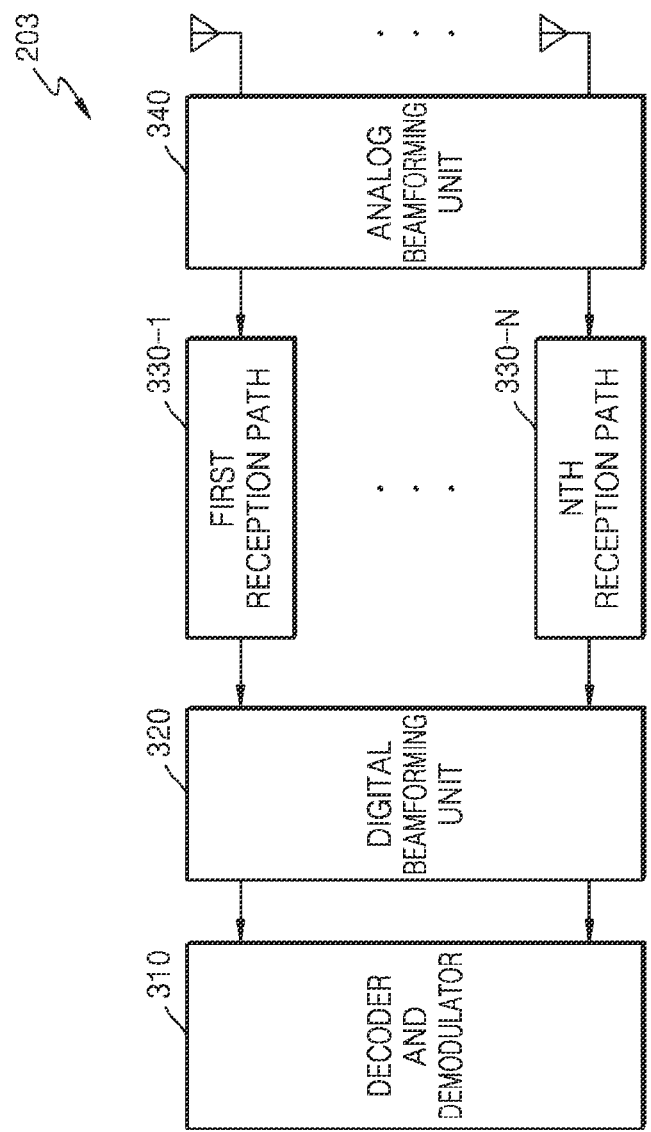
FIG. 3 is a detailed block diagram of a communication circuit according to embodiments of the inventive concept.

FIG. 3 is a detailed block diagram of a communication circuit 203 according to embodiments of the inventive concept.

Referring to FIG. 3, the communication circuit 203 may include a decoder and demodulator 310, a digital beamforming unit 320, a first reception path 330-1 to a Nth reception path 330-N, and an analog beamforming unit 340.

According to one embodiment, the decoder and demodulator 310 may perform channel decoding. For channel decoding, at least one of a low density parity check (LDPC) code, a convolution code, a polar code, and a turbo code may be used/decoded. For example, the decoder and demodulator 310 may correspond to the decoder 220 of the reception device 200 in FIG. 1.

The digital beamforming unit 320 multiplies analog signals received through the first reception path 330-1 to the Nth reception path 330-N by beamforming weights. Here, beamforming weights are used to change the magnitude and/or phase of a signal. In this case, modulation symbols multiplexed according to a MIMO transmission technique may be received by the first reception path 330-1 to the Nth reception path 330-N.

The analog beamforming unit 340 performs beamforming on an analog signal. The analog beamforming unit 340 may perform beamforming on an analog reception beam to receive a MIMO signal.

Each of the first reception path 330-1 to the Nth reception path 330-N may include a fast fourier transform (FFT) operation unit, an ADC, a cyclic prefix removal unit, and a serial-parallel converter and a down converter. Each of the first reception path 330-1 to the Nth reception path 330-N may down-convert the received signal to a baseband frequency, remove a cyclic prefix to generate a serial time domain baseband signal, convert serial time domain baseband signals to parallel time domain signals, perform an FFT algorithm to generate N parallel frequency domain signals, and convert parallel frequency domain signals into a sequence of modulated data symbols. Thus, the first reception path 330-1 to the Nth reception path 330-N may each provide independent signal processing processes for a respective one of multiple streams generated through digital beamforming. However, some of the components of the first reception path 330-1 to the Nth reception path 330-N may be commonly used depending on the implementation method.

Figure 4:
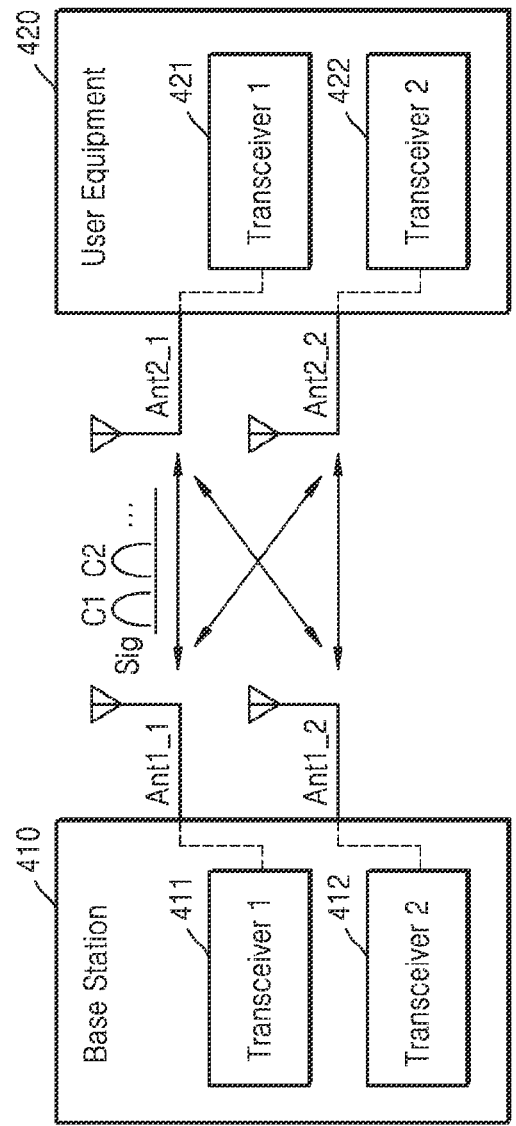
FIG. 4 illustrates a Multiple-Input and Multiple-Output (MIMO) environment according to embodiments of the inventive concept.

FIG. 4 illustrates a MIMO environment according to embodiments of the inventive concept.

Referring to FIG. 4, a base station 410 and UE 420 may communicate with each other using a MIMO scheme. To communicate each other, the base station 410 may include a plurality of antennas Ant1_1 and Ant1_2 and the UE 420 may include a plurality of antennas Ant2_1 and Ant2_2. In FIG. 4, the base station 410 and the UE 420 are each illustrated as having two antennas, (Ant1_1 and Ant1_2) and (Ant2_1, and Ant2_2), respectively, but are not limited thereto. In other examples, each of the base station 410 and the UE 420 includes three or more antennas.

The base station 410 may include a first transceiver 411, a second transceiver 412, a first antenna Ant1_1 and a second antenna Ant1_2. Each of the first transceiver 411 and the second transceiver 412 may be connected to one respective antenna, Ant1_1 and Ant1_2, respectively. When the base station 410 operates as a transmission device, the first transceiver 411 and the second transceiver 412 may operate as transmitters, and when the base station 410 operates as a reception device, the first transceiver 411 and the second transceiver 412 may each operate as a receiver.

The first transceiver 411 may generate a first carrier aggregation signal Sig by merging the first component carrier signal C1 with the second component carrier signal C2 in a transmission mode, and transmit the generated first signal Sig to the UE 420. When the UE similarly generates a first signal Sig and transmits the same to the base station 410, the first transceiver 411 may extract both first and second component carrier signals C1 and C2 from the first signal Sig received from the UE 420. The second transceiver 412 may likewise transmit a carrier aggregation signal. In other examples, the first transceiver 411 and/or the second transceiver 412 transmit a single component carrier signal, or receive from the UE 420 only signal component carrier signals. The UE 420 may include a third transceiver 421, a fourth transceiver 422, a third antenna Ant2_1, and a fourth antenna Ant2_2. Since the UE 420 may have some functionality substantially the same as or similar to that just described for the base station 410, a description thereof is omitted.

Figure 5A:
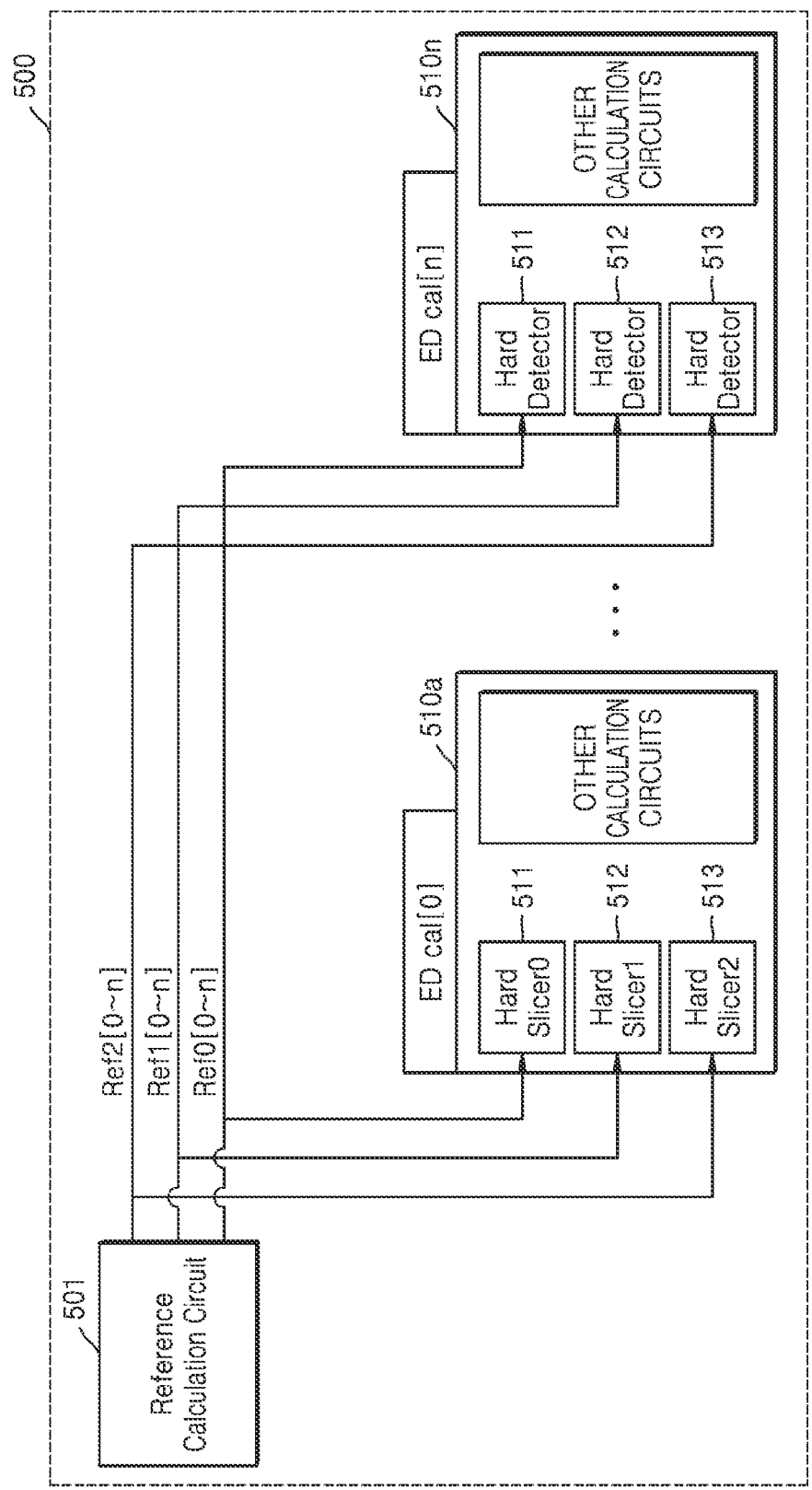
FIG. 5A is a detailed block diagram of a multi-ED (Euclidean Distance) calculation circuit according to embodiments of the inventive concept.

FIG. 5A is a detailed block diagram of a multi-ED calculation circuit 500 according to exemplary embodiments of the present disclosure.

Referring to FIG. 5A, the multi-ED calculation circuit 500 may include a reference calculation circuit 501 and a plurality of ED calculation circuits 510a to 510n (a is an integer greater than or equal to 0 and less than n, n is an integer greater than 0). The plurality of ED calculation circuits 510a to 510n may be referred to as soft decision calculation circuits. According to one embodiment, the multi-ED calculation circuit 500 may be included in the MIMO detector 210 of FIG. 1. The reference calculation circuit 501 may calculate a plurality of values required to specify a symbol on a QAM constellation according to a modulation order of QAM. The plurality of values may be decision boundary values for specifying a symbol on a constellation. Referring to FIGS. 5A and 5B, in the case of 256 QAM, the reference calculating circuit 501 may generate 8 reference values. In the case of 1024 QAM, the reference calculation circuit 501 may generate 16 reference values.

Referring to FIGS. 5A and 5B, it may be seen that as the QAM modulation order increases, the number of comparators included in each of hard decision detectors ("hard detectors") 511 to 513 also increases. For example, in the case of 256 QAM, 8 reference values are generated, since a comparison based on reference values is performed for each in-phase component and each quadrature phase component, it may be seen that the number of comparators provided for each of the hard detectors 511 to 513 is 16, twice the reference values. As another example, for 1024 QAM, there may be 16 reference values for distinguishing 1024 constellation coordinates arranged on the constellation map, and the number of comparators provided for each of the hard detectors 511 to 513 may be 32, twice the reference values, since a comparison for each of the in-phase component and the quadrature phase component may conventionally utilize a comparator. Similarly, 4K QAM may conventionally utilize 32 reference values and 64 comparators per hard detector, and 16K QAM may conventionally utilize 64 reference values and 128 comparators.

According to an embodiment, in the case of the reception device 200 supporting rank 4, the multi-ED calculation circuit 500 may include a limited number of Euclidean Distance (ED) calculation circuits 510a to 510n to reduce complexity. Each of the plurality of ED calculation circuits 510a to 510n may compute one or more EDs between measured complex values of a symbol and each of a plurality of reference values Refi[0~n] (i=0 to 2) on a constellation diagram, to arrive at a binary value represented by the symbol. For example, n may be 31 to reduce the complexity of the multi-ED calculation circuit 500. For instance, if 1024 QAM is supported, 3 hard detectors 511 to 513 may be included for each of 32 ED calculation circuits, and since each of the hard detectors 511 to 513 includes 32 comparators, which is twice the number of reference values, the multi-ED calculation circuit 500 may include 3072 comparators. That is, as the QAM modulation order increases, the number of comparators inside the multi-ED calculation circuit 500 increases exponentially, which may increase both hardware size and power consumption.

Referring to FIG. 5A, shown are three hard detectors 511 to 513 for each of the plurality of ED calculation circuits 510a to 510n and other calculation circuits for performing calculations other than those performed by the hard detectors 511 to 513 to calculate ED, but the inventive concept is not limited thereto. The number of hard detectors included in each of the plurality of ED calculation circuits 510a to 510n may vary depending on a rank value. For example, in the case of the reception device 200 supporting rank 2, each of the plurality of ED calculation circuits 510a to 510n may include only one hard detector. A hard detector may also be referred to as a "Hard Slicer".

FIG. 6 shows an example of reference values according to embodiments of the inventive concept.

As the QAM modulation order increases, a relationship between the symbol using gray mapping and the constellation coordinates of QAM is shown in the following equations.

$$\dot{x}=(1-2b_0)+j(1-2b_1) \quad \text{[Equation 1]}$$

$$\dot{x}=(1-2b_0)[2-(1-2b_2)]+j(1-2b_2)[2-(1-2b_2)] \quad \text{[Equation 2]}$$

$$\dot{x}=(1-2b_0)[4-(1-2b_2)[2-(1-2b_4)]]+j(1-2b_1)[4-(1-2b_2)[2-(1-2b_5)]] \quad \text{[Equation 3]}$$

$$\dot{x}=(1-2b_0)[8-(1-2b_2)[4-(1-2b_4)[2-(1-2b_6)]]]+j(1-2b_1)[8-(1-2b_2)[4-(1-2b_5)[2-(1-2b_7)]]] \quad \text{[Equation 4]}$$

$$\dot{x}=(1-2b_0)[16-(1-2b_2)[8-(1-2b_4)[4-(1-2b_6)[2-(1-2b_8)]]]]+j(1-2b_1)[16-(1-2b_8)[8-(1-2b_5)[4-(1-2b_7)[2-(1-2b_9)]]]] \quad \text{[Equation 5]}$$

Here, Equation 1 shows the relationship between the constellation coordinates ($b_0$, $b_1$) and the symbol $\dot{x}$ under consideration in the case of Quadrature Phase Shift Keying (QPSK). Equation 2 shows the relationship between the bit string ($b_0$, $b_1$, $b_2$, $b_3$) and the symbol $\dot{x}$ in 16 QAM. Equation 3 shows the relationship between the bit string ($b_0$, $b_1$, $b_2$, $b_3$, $b_4$, $b_5$), and the symbol $\dot{x}$ in 64 QAM. Equation 4 shows the relationship between the bit string ($b_0$, $b_1$, $b_2$, $b_3$, $b_4$, $b_5$, $b_6$, $b_7$) and symbol $\dot{x}$ in 256 QAM. Equation 5 shows the relationship between the bit string ($b_0$, $b_1$, $b_2$, $b_3$, $b_4$, $b_5$, $b_6$, $b_7$, $b_8$, $b_9$) and the symbol $\dot{x}$ in 256 QAM.

According to an embodiment, the QAM of the next order and the QAM of the previous order may have a recursive structure based on the above equations. Utilizing these characteristics, the decision rule in case the QAM modulation order is $2^n$ may be summarized as in Equation 6 and Equation 7 below. To this end, Equation 6 shows each bit (of a bit string) that may be determined based on an in-phase (I, or "Real" (Re)) component of the symbol. Equation 7 shows each bit (of a bit string) that may be determined based on a quadrature phase (Q, or "Imaginary" (Im)) component of the symbol. Herein, "bits associated with an in-phase (I) component" may also be referred to as "bits of an in-phase (I) component", and "bits associated with a quadrature phase (Q) component" may also be referred to as "bits of a quadrature phase (Q) component". It is noted here that in equations 6 and 7, reference values $A_0$ to $A_3$ may each correspond to a reference value such as Ref0, Ref1, Ref2, . . . of FIG. 5A, and may be different for different QAM types, as discussed below.

$$b_0 = \begin{cases} 0 & \text{if } \text{Re}(y) \geq 0 \\ 1 & \text{if } \text{Re}(y) < 0 \end{cases} \quad \text{[Equation 6]}$$

$$b_2 = \begin{cases} 0 & \text{if } A_0 - |\text{Re}(y)| \geq 0 \\ 1 & \text{if } A_0 - |\text{Re}(y)| < 0 \end{cases}$$

$$b_4 = \begin{cases} 0 & \text{if } A_1 - |A_0 - |\text{Re}(y)|| \geq 0 \\ 1 & \text{if } A_1 - |A_0 - |\text{Re}(y)|| < 0 \end{cases}$$

$$b_6 = \begin{cases} 0 & \text{if } A_2 - |A_1 - |A_0 - |\text{Re}(y)||| \geq 0 \\ 1 & \text{if } A_2 - |A_1 - |A_0 - |\text{Re}(y)||| < 0 \end{cases}$$

$$b_8 = \begin{cases} 0 & \text{if } A_3 - |A_2 - |A_1 - |A_0 - |\text{Re}(y)|||| \geq 0 \\ 1 & \text{if } A_3 - |A_2 - |A_1 - |A_0 - |\text{Re}(y)|||| < 0 \end{cases}$$

$$b_1 = \begin{cases} 0 & \text{if } \text{Im}(y) \geq 0 \\ 1 & \text{if } \text{Im}(y) < 0 \end{cases} \quad \text{[Equation 7]}$$

-continued $$b_3 = \begin{cases} 0 & \text{if } A_0 - |\text{Im}(y)| \geq 0 \\ 1 & \text{if } A_0 - |\text{Im}(y)| < 0 \end{cases}$$

$$b_5 = \begin{cases} 0 & \text{if } A_1 - |A_0 - |\text{Im}(y)|| \geq 0 \\ 1 & \text{if } A_1 - |A_0 - |\text{Im}(y)|| < 0 \end{cases}$$

$$b_7 = \begin{cases} 0 & \text{if } A_2 - |A_1 - |A_0 - |\text{Im}(y)||| \geq 0 \\ 1 & \text{if } A_2 - |A_1 - |A_0 - |\text{Im}(y)||| < 0 \end{cases}$$

$$b_9 = \begin{cases} 0 & \text{if } A_3 - |A_2 - |A_1 - |A_0 - |\text{Im}(y)|||| \geq 0 \\ 1 & \text{if } A_3 - |A_2 - |A_1 - |A_0 - |\text{Im}(y)|||| < 0 \end{cases}$$

Referring to FIG. 6, reference values $A_0$ to $A_3$ in Equation 6 and Equation 7 may be as shown in the table. It is seen that a reference value such as $A_0$ may be a different constant for different respective QAM types (e.g., $A_0$ is 2 for 16 QAM but is 4 for 64 QAM). According to the embodiment, for $2^{2N}$ QAM, the first reference value $A_0$ may be $2^{N-1}$, the second reference value $A_1$ may be $2^{N-2}$, and N is a natural number. It should also be noted that normalized ideal values for I and Q may be set consistent with equations 6 and 7. For instance, for 16 QAM, I and Q may each have ideal values of −4, −2, 2 and 4, which result in a desired I-Q constellation (correlated with 4-bit strings) in accordance with equations 6 and 7 and the table values in FIG. 6. The normalized values may be expanded to higher normalized values for higher QAM orders. For instance, each of I and Q may have a maximum ideal value higher than 4 for each of 64 QAM and higher QAM orders.

In accordance with embodiments herein which derive bit strings from I and Q values based on Eqns. 6 and 7, the number of comparators utilized for each of the hard detectors 511 to 513 may be reduced compared to conventional QAM demodulators because operations to derive bit values are sequentially performed from upper bits to lower bits of bit strings. Referring to Equations 6 and 7, the most significant bit $b_0$ of the in-phase component is determined according to whether the real part of the received signal is positive or negative. The next-order bit $b_2$ of the in-phase component may be determined by determining whether a value obtained by subtracting the absolute value ("abs") of the real part ("abs(Re)") of the received signal from $A_0$ is a positive number or a negative number. The middle bit $b_4$ of the in-phase component may be determined by determining whether a value obtained by subtracting the absolute value of the second-order bit $b_2$ from $A_1$ is positive or negative. The next lower bit $b_6$ may be determined by determining whether a value obtained by subtracting the absolute value of the middle bit $b_4$ from $A_2$ is positive or negative. The least significant bit $b_6$ may be determined by determining whether a value obtained by subtracting the absolute value of the next least significant bit $b_6$ from $A_3$ is positive or negative. For example, the bit $b_{2n}$ may be determined by determining whether a value obtained by subtracting the absolute value of the bit $b_{2(n-1)}$ from $A_{n-1}$ is a positive number or a negative number. A similar summary of Equation 7 may be provided for the bits of the quadrature phase (Q) components but is omitted for brevity because Equation 7 for the Q components is analogous to Equation 6 for the I components.

To form a recursive structure, it may be assumed that $A_0-|\text{Re}(y)|$ is replaced by X. Now, it may be seen that $b_4$ is determined to be 0 if $A_1-|X|$ using the substituted X when greater than or equal to 0, and is determined to be 1 if less than 0. Generalizing the recursive structure between the upper bit and the lower bit may be as shown in the following equation.

$$b_{2n} = \begin{cases} 0 & \text{if } A_{(n-1)} - |b_{2(n-1)}| \geq 0 \\ 1 & \text{if } A_{(n-1)} - |b_{2(n-1)}| < 0 \end{cases} \quad \text{[Equation 8]}$$

Hereinafter, embodiments for reducing hardware complexity using the recursive structure are described.

Figure 7A:
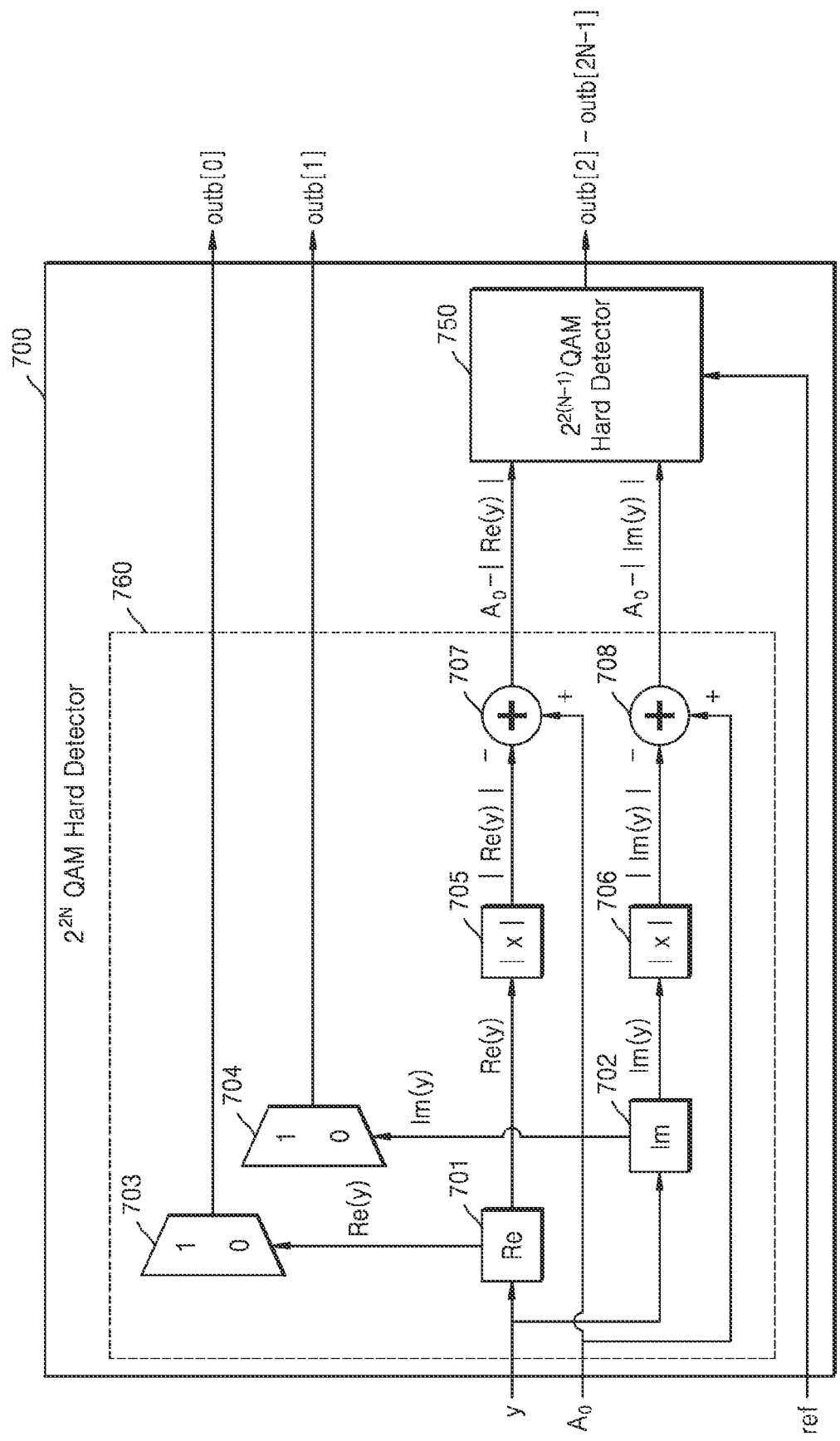
FIG. 7A illustrates a recursive structure hard detector according to embodiments of the inventive concept.

FIG. 7A illustrates a hard detector 700 of a recursive structure according to embodiments of the inventive concept.

The hard detector 700 may include a lower-level hard detector 750 and an additional calculation circuit 760. The lower-level hard detector 750 may be referred to by various terms such as a sub-hard detector (for example, a sub-hard decision circuit) or a subordinate hard detector. The hard detector 700 may correspond to a QAM demodulator ("QAM hard detector") having a modulation order of $2^{2N}$. For example, when N is 5, the hard detector 700 may be a 1024 QAM demodulator. In another example, when N is 4, the hard detector 700 may be a 256 QAM demodulator.

The lower-level hard detector 750 may be a QAM demodulator ("sub-QAM demodulator") corresponding to a lower modulation order than the hard detector 700. That is, the lower-level hard detector 750 may be a $2^{2(N-1)}$ QAM demodulator. For example, when N is 5, the hard detector 700 may be a 1024 QAM demodulator and the lower-level hard detector 750 may be a 256 QAM demodulator.

The additional calculation circuit 760 may output the two most significant bits of the bit string corresponding to the symbol x̂, and transfer a replacement value X for using the recursive structure to the lower-level hard detector 750.

According to the embodiment, to output the most significant bits $b_0$ of the in-phase component and the most significant bit $b_1$ of the quadrature phase component among the bit strings corresponding to the symbol x̂, respectively, the additional calculation circuit 760 may include a real part returning circuit ("function") (or equivalently, "Re") 701, an imaginary part returning circuit ("function") (or equivalently, "Im") 702, and two comparators, that is, first and second comparators 703 and 704.

The additional calculation circuit 760 may output the most significant bit (MSB) of the in-phase component and the most significant bit of the quadrature phase component among the bit strings corresponding to the symbol x̂. Of the bit string corresponding to the symbol x̂, the remaining bits except for the most significant bit $b_0$ of the in-phase component and the most significant bit $b_1$ of the quadrature phase component may be output through the operation of the lower-level hard detector 750.

The real part returning function 701 may receive a first complex symbol "y" and derive therefrom an output Re(y) (a real part of "y", or equivalently, an in-phase (I) component of "y") to the first comparator 703. The first comparator 703 may receive the output Re(y) and vary the output according to whether the output Re(y) is greater than or less than 0. For example, the first comparator 703 may output outb[0] of 1 when Re(y) is less than 0 (negative number), and output outb[0] of 0 when Re(y) is greater than 0 (positive number). Here, outb[0] may be the most significant bit $b_0$ of the in-phase component.

The imaginary part returning function 702 may also receive the first complex symbol "y" and derive therefrom an output Im(y) (equivalently, a Q component of "y") to the second comparator 704. The second comparator 704 may receive an output Im(y) and vary the output according to whether it is greater than or less than 0. For example, the second comparator 704 may output outb[1] of 1 when the output Im(y) is less than 0 (negative number), and output outb[1] of 0 when the output Im(y) is greater than 0 (positive number). Outb[1] may be the most significant bit $b_1$ of the quadrature phase component.

For embodiments demodulating 16 QAM or higher modulation schemes, the additional calculation circuit 760 may further include two absolute value returning functions (calculation circuits or "calculators") (or equivalently, "|x|"), e.g., first and second returning functions 705 and 706, and two summers ("summing circuits"), e.g., first and second summers 707 and 708, to pass the replacement value to the lower-level hard detector 750.

The first absolute value returning function 705 may receive an output Re(y) from the real part returning function 701, and provide an output |Re(y)| ("abs(Re(y))" or equivalently, "abs(I(y))") obtained by taking an absolute value thereof, to the first summer 707. The first summer 707 may subtract the output |Re(y)| from the first reference value $A_0$ and provide the result to the lower-level hard detector 750. Thus, the value provided to the lower-level hard detector 750 from the first summer 707 is an input value for calculating the remaining bits except for the most significant bit $b_0$ among the bits of the in-phase component. Explained another way, the QAM demodulator 700 QAM demodulates a first complex symbol; and the lower-level hard detector 750 is configured to QAM demodulate a second complex symbol (number). An I component of the second complex symbol is based on a first summed output (e.g., the output of summer 707), and a Q component of the second complex symbol is based on a second summed output (e.g., the output of summer 708).

The lower-level hard detector 750 may be configured with circuitry suitable for the "N" value in FIG. 7A. For instance, if N=2, a 16 QAM hard detector 700 is exemplified, and the lower-level hard detector 750 may be a QPSK hard detector including a first comparator (not shown) for comparing ($A_0$−abs(Re(y))) with 0 to output outb[2] according to the comparison, and a second comparator (not shown) for comparing ($A_0$−abs(Im(y))) with 0 to output outb[3] according to the comparison. In general, the lower level hard detector 750 may be either a conventional $2^{2(N-1)}$ QAM hard detector having a conventional number of comparators for deciding and outputting (2N−2) bits mapped to the second complex symbol (number) applied thereto (($A_0$−abs(Re(y))+ j($A_0$−abs(Im(y)))), or a $2^{2(N-1)}$ QAM hard detector in accordance with concepts taught herein, having a reduced number of comparators for deciding and outputting the same (2N−2) bits mapped to the applied second complex number.

The second absolute value returning function 706 may receive an output Im(y) from the imaginary part returning function 702 and provide an output |Im(y)| ("abs(Im(y))", or equivalently, "abs((y))") obtained by taking an absolute value thereof to the second summer 708. The second summer 708 may subtract the output |Im(y)| from the first reference value $A_0$ and provide the result to the lower-level hard detector 750. Thus, the value provided to the lower-level hard detector 750 from the second summer 708 is an input value for calculating the remaining bits except for the most significant bit $b_1$ among the bits of the quadrature phase component. The lower-level hard detector 750 may perform a binary-based parallel operation based on the values received from the first summer 707 and the second summer 708, respectively, to output the remaining bits outb[2] to outb[2N−1].

Referring to Equation 8 and FIG. 7A, it may be seen that the output of the first summer 707 has the same form as the replacement value $A_0$−|Re(y)| for forming a recursive structure, and the output of the second summer 708 has the same form as a replacement value $A_0-|Im(y)|$ for forming a recursive structure. Hence, the hard detector 700 may be implemented by adding two comparators and two summers for calculating each of the most significant bits of the in-phase component and quadrature phase component to the one lower order lower-level hard detector, that is, the lower-level hard detector 750.

Figure 7B:
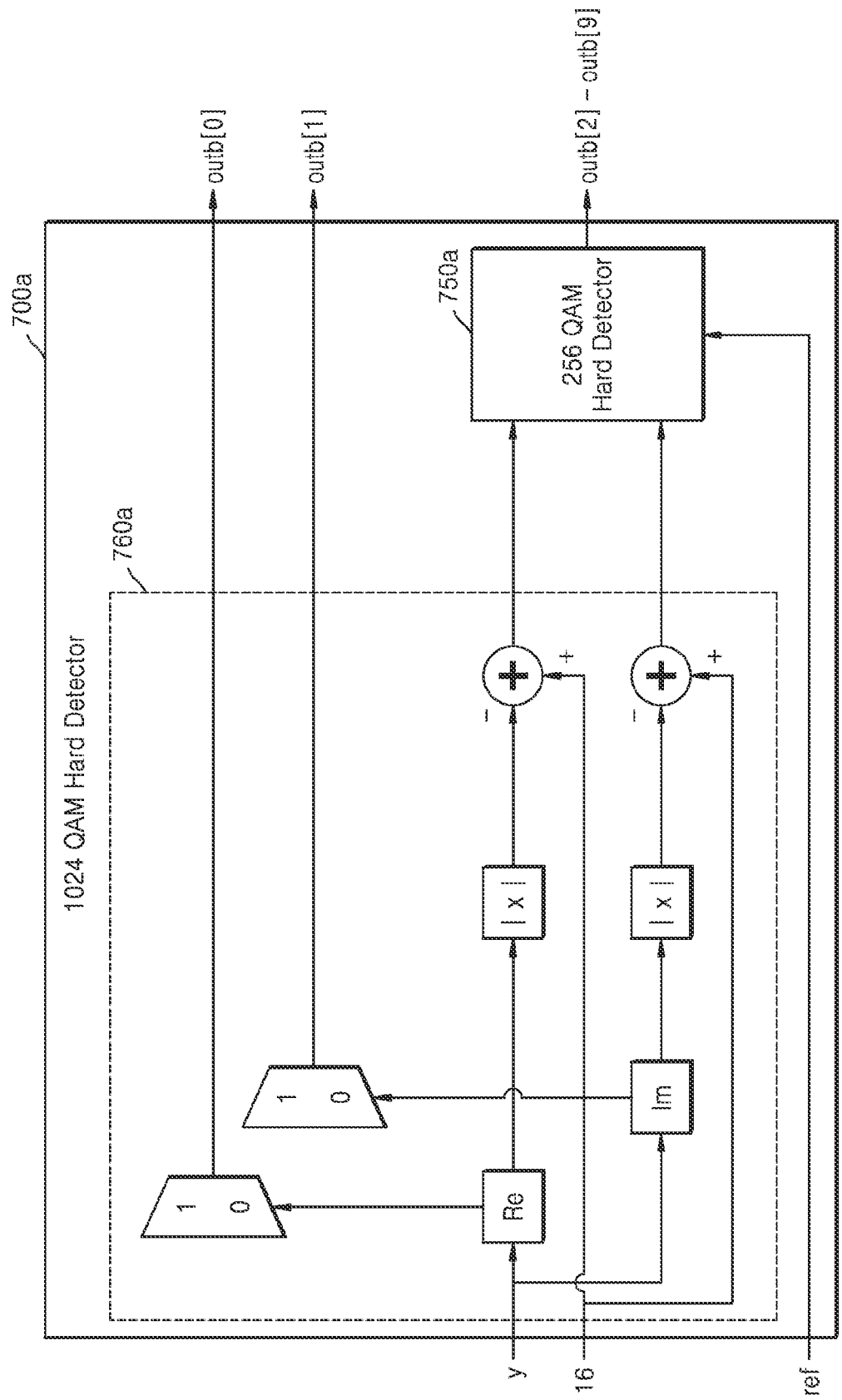
FIG. 7B shows a 1024 Quadrature Amplitude Modulation (QAM) demodulator with a recursive structure according to embodiments of the inventive concept.

Referring to FIG. 7B, a hard detector 700a may correspond to a 1024 QAM demodulator, and a lower-level hard detector 750a may correspond to a 256 QAM demodulator. As described above with reference to FIG. 7A, the 1024 QAM demodulator 700a does not include twice the number of reference values than a 256 QAM demodulator and twice the number of comparators required as the number of reference values double, and may be implemented to produce the same output as a conventional 1024 QAM demodulator by having only the additional calculation circuit 760a of a single stage at the front end of the 256 QAM demodulator. However, if the 1024 QAM demodulator is implemented by a binary operation according to the decision boundary method, the time required to determine the bit string (outb[0] to outb[9]) may be shorter. As shown in the additional calculation circuit 760a of the single stage, because the real part returning function, the absolute value returning function, and the summer are connected in series or concatenated with each other, a certain amount of time delay occurs. Since a 1024 QAM demodulator based on an existing (conventional) decision boundary method requires a large number of comparators to achieve a short bit string determination time corresponding to the symbol $\dot{x}$, both hardware complexity and power consumption may be high. In a 1024 QAM demodulator according to an embodiment of the inventive concept, since the number of required comparators is considerably reduced, power consumption and hardware complexity may be reduced.

Figure 7C:
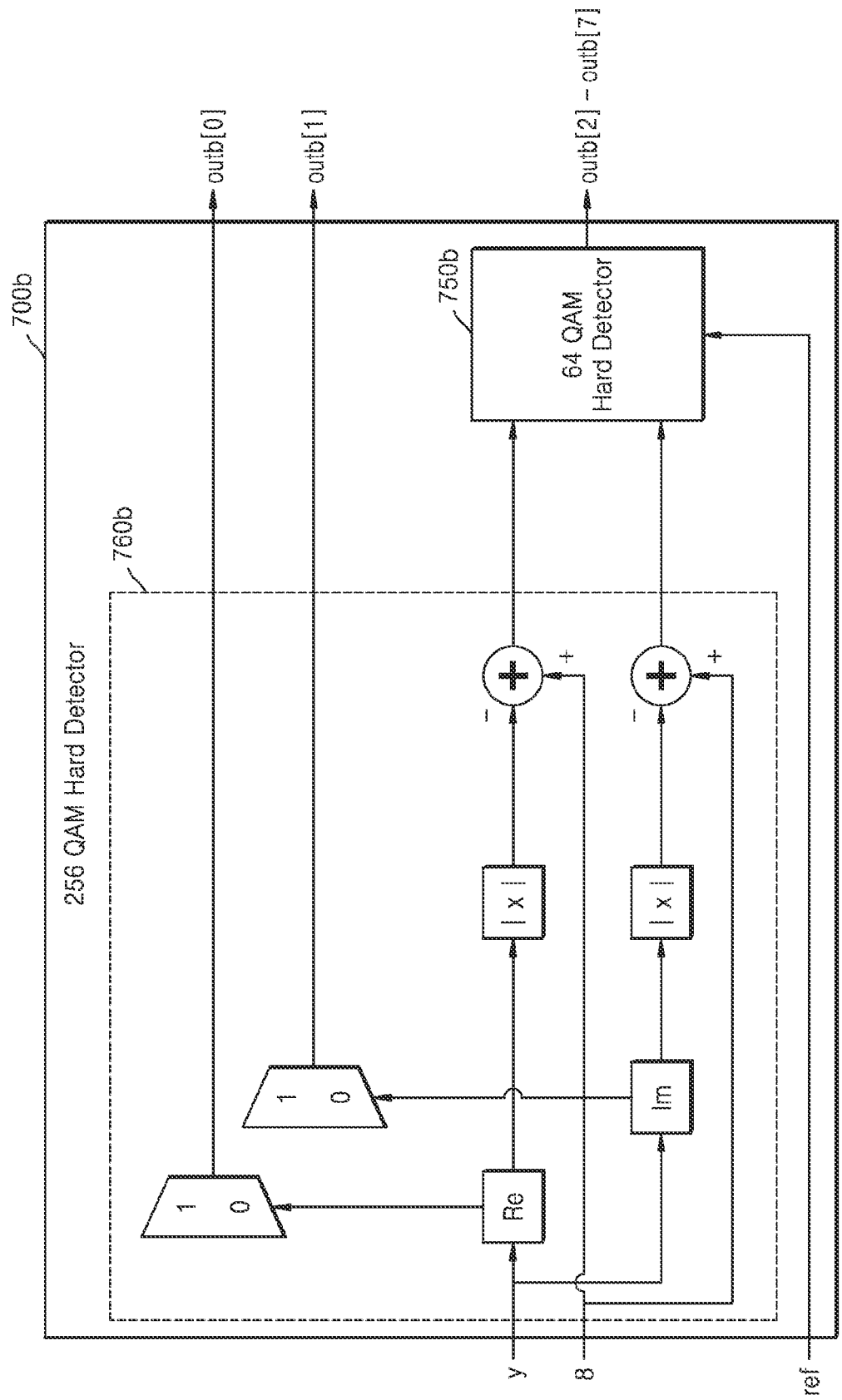
FIG. 7C shows a 256 QAM demodulator with a recursive structure according to embodiments of the inventive concept.
Figure 7D:
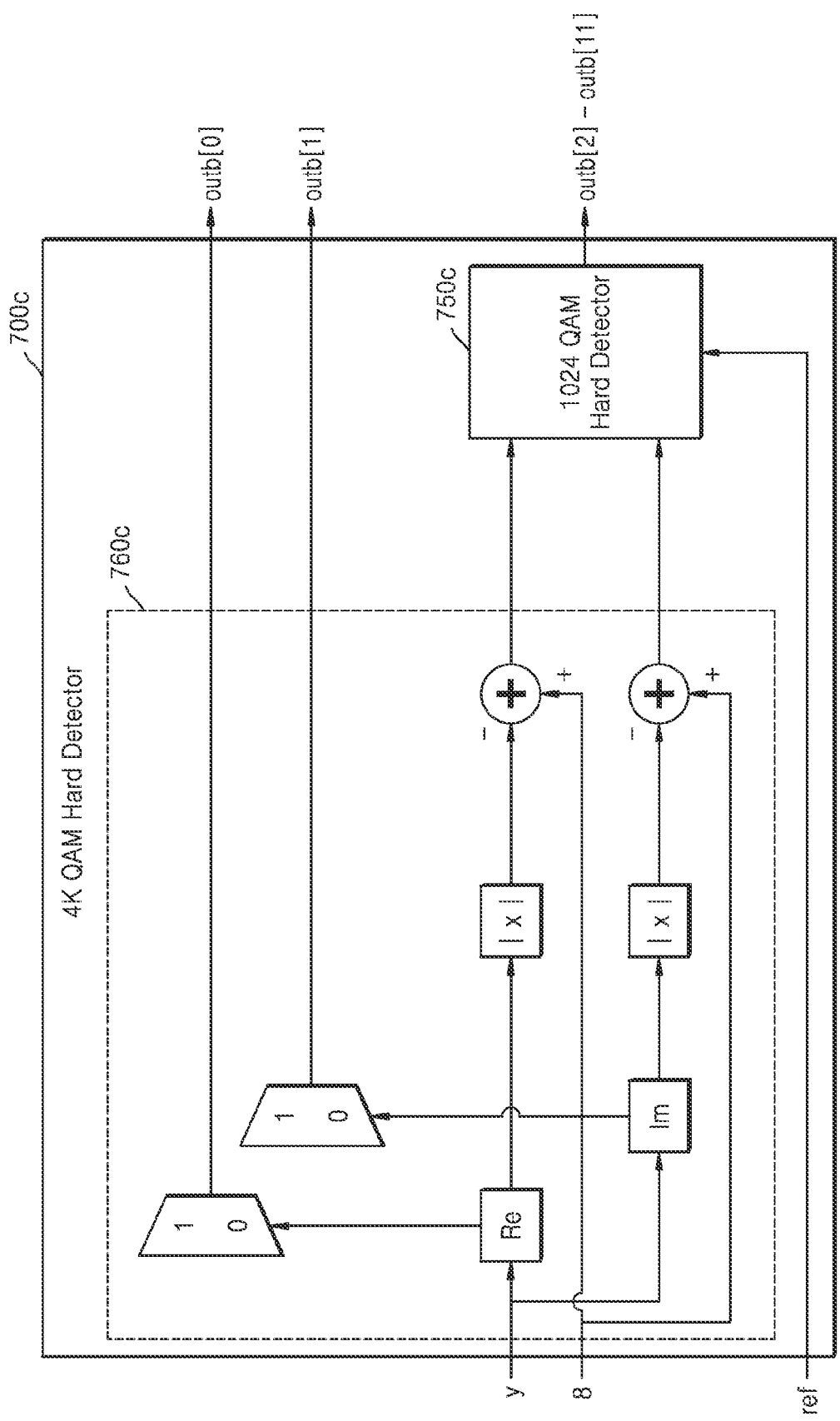
FIG. 7D illustrates a 4K QAM demodulator with a recursive structure according to embodiments of the inventive concept.

Referring to FIG. 7C, when a hard detector 700b is a 256 QAM demodulator, the same general effect (e.g., a smaller number of required comparators) may be achieved by having a lower-level hard detector 750b of a 64 QAM demodulator with an additional first-stage calculation circuit 760b. Referring to FIG. 7D, when a hard detector 700c is a 4K QAM demodulator, the same general effect may be obtained by having a lower-level hard detector 750c of a 1024 QAM demodulator with an additional first-stage calculation circuit 760c. Since the general concepts as in the embodiments of FIGS. 7A and 7B are applicable to those of FIGS. 7C and 7D, redundant description will be omitted.

Figure 8:
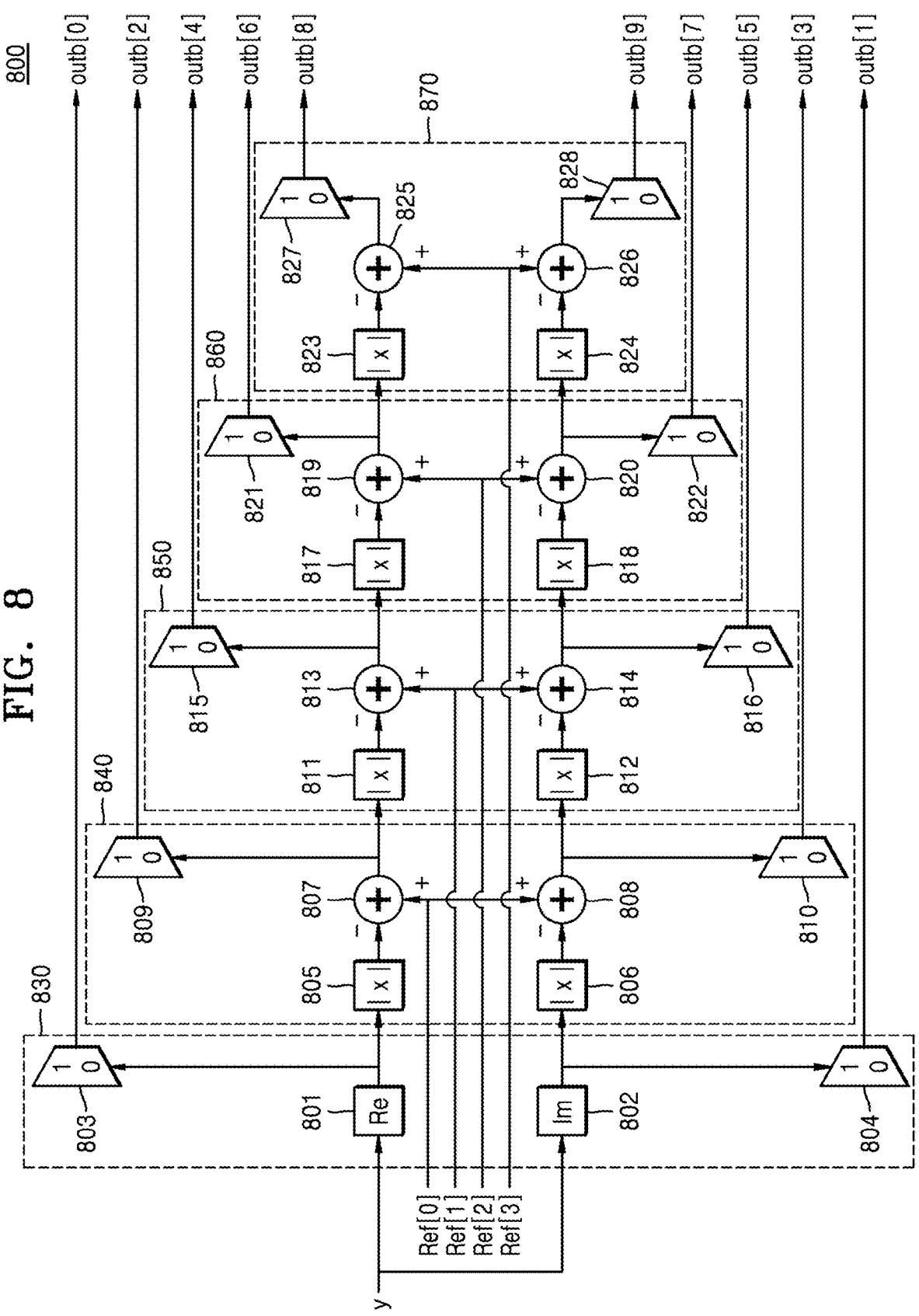
FIG. 8 illustrates an example of a 1024 QAM demodulator based on sequential serial operation according to an embodiment.

FIG. 8 illustrates an example of a 1024 QAM demodulator based on a "sequential serial" operation according to an embodiment.

Referring to FIG. 8, a hard detector 800 may include multi-stage additional calculation circuits. The hard detector 800 of FIG. 8 is not implemented with a first-stage additional calculation circuit and a lower-level hard detector having a conventionally large number of comparators. Rather, the hard detector 800 may be implemented with multiple stages of additional calculation circuits connected in series or concatenated, and with a reduced number of comparators to reduce hardware size and power consumption. As illustrated in FIG. 8, in addition to the comparators 803 and 804, eight additional comparators 809, 810, etc. are included, for a total of 10 comparators. The 1024 QAM comparator of FIG. 7B, on the other hand, may utilize 16 comparators in the 256 QAM hard detector 750a in addition to the two comparators that output bits outb[0] and outb[1], for a total of 18 comparators.

Since the hard detector 800 of FIG. 8 exemplifies a 1024 QAM demodulator as an example, first to fifth additional calculation circuits 830 to 870 are shown, but the inventive concept is not limited thereto. According to various embodiments, when the hard detector 800 is a $2^{2N}$ QAM demodulator, the hard detector 800 may be implemented by connecting N-stage additional calculation circuits in series.

The first additional calculation circuit ("MSB calculation circuit") 830 may output "the most significant bits $b_0$ and $b_1$ of each of the in-phase (I) component and the quadrature phase (Q) component". As explained earlier in connection with equations 6 and 7, herein, $b_0$ is the most significant bit (MSB) of a bitstream represented by a complex symbol being demodulated, and $b_1$ is the next most significant bit, where the value of $b_0$ may be based solely on (and therefore associated with) the I component value (e.g., its polarity) and the value of $b_1$ may be based solely on (and therefore associated with) the Q component value (e.g., its polarity); hence, the terminology "$b_0$ is the MSB of the I component" and "$b_1$ is the MSB of the Q component" and like terminology may be used herein. It is further noted that in other embodiments, the relationship between $b_0$, $b_1$, the I component and the Q component may be swapped such that $b_0$ is associated with the Q component and $b_1$ is associated with the I component. It follows that in these other embodiments, $b_2$, $b_4$, etc. are associated with the Q component and $b_3$, $b_5$, etc. are associated with the I component.

The most significant bit $b_0$ of the in-phase component may correspond to outb[0], and the most significant bit $b_1$ of the quadrature phase component may correspond to outb[1], respectively. To this end, the first additional calculation circuit 830 may include a real part returning circuit ("function") 801, an imaginary part returning circuit ("function") 802, and two comparators 803 and 804. The comparator ("real number comparator") 803 obtains the real part of the received signal y from the real part returning function 801, and outputs 0 when greater than 0 and 1 when less than 0 as outb[0]. The comparator ("imaginary number comparator") 804 obtains the imaginary part of the received signal y from the imaginary part returning function 802, and outputs 0 when greater than 0 and 1 when less than 0 as outb[1].

The second additional calculation circuit 840 may output next-order bits $b_2$ and $b_3$ of each of the in-phase component and the quadrature phase component. The next-order bit $b_2$ of the in-phase component may correspond to outb[2], and the next-order bit $b_3$ of the quadrature phase component may correspond to outb[3]. To this end, the second additional calculation circuit 840 may include two absolute value returning functions 805 and 806, two summers 807 and 808, and two comparators 809 and 810.

The summer 807 may receive absolute values of outputs corresponding to the first reference value Ref[0] and the in-phase component of the first additional calculation circuit 830, respectively. The first reference value Ref[0] may correspond to $A_0$ of FIG. 6. The summer 807 may subtract the absolute value of the output corresponding to the in-phase component of the first additional calculation circuit 830 from the first reference value Ref[0] and provide the result value to the comparator 809. That is, the value received by the comparator 809 may be based on the replacement value of Equation 8. The comparator 809 may output 0 if the received value is greater than 0 and 1 if the received value is less than 0 as outb[2].

The summer 808 may receive absolute values of outputs corresponding to the first reference value Ref[0] and the quadrature phase component of the first additional calculation circuit 830, respectively. The summer 808 may subtract the absolute value of the output corresponding to the quadrature phase component of the first additional calculation circuit 830 from the first reference value Ref[0] and provide the result value to the comparator 810. The comparator 810 may output 0 if the received value is greater than 0 and 1 if the received value is less than 0 as outb[3].

The third additional calculation circuit 850 may output middle bits $b_4$ and $b_5$ of each of the in-phase component and the quadrature phase component. The middle bit $b_4$ of the in-phase component may correspond to outb[4], and the middle bit $b_5$ of the quadrature phase component may correspond to outb[5]. To this end, the third additional calculation circuit 850 may include two absolute value returning functions 811 and 812, two summers 813 and 814, and two comparators 815 and 816.

The summer 813 may receive absolute values of outputs corresponding to the second reference value Ref[1] and the in-phase component of the second additional calculation circuit 840, respectively. The second reference value Ref[1] may correspond to $A_1$ of FIG. 6. The summer 813 may subtract the absolute value of the output corresponding to the in-phase component of the second additional calculation circuit 840 from the second reference value (Ref[1]) and provide the result value to the comparator 815. That is, the value received by the comparator 809 is obtained by subtracting the absolute value of the output of the additional calculation circuit in the previous step from the reference value corresponding to the additional calculation circuit in the current step, and has the same form as the replacement value in Equation 8. The comparator 815 may output 0 as outb[4] if the received value is greater than 0 and 1 if it is less than 0.

The summer 814 may receive absolute values of outputs corresponding to the second reference value Ref[1] and the quadrature phase component of the second additional calculation circuit 840, respectively. The summer 814 may subtract the absolute value of the output corresponding to the quadrature phase component of the second additional calculation circuit 840 from the second reference value Ref[1] and provide the result value to the comparator 816. The comparator 816 may output 0 if the received value is greater than 0, and 1 if it is less than 0 as outb [5].

The fourth additional calculation circuit 860 may output low-order bits ("lower bits", or equivalently, "next order bits") $b_6$ and $b_7$ of each of the in-phase component and the quadrature phase component. The next lower bit $b_6$ of the in-phase component may correspond to outb[6], and the next lower bit $b_7$ of the quadrature phase component may correspond to outb[7]. To this end, the fourth additional calculation circuit 860 may include two absolute value returning functions 817 and 818, two summers 819 and 820, and two comparators 821 and 822.

The summer 819 may receive absolute values of outputs corresponding to the third reference value Ref[2] and the in-phase component of the third additional calculation circuit 850, respectively. The third reference value Ref[2] may correspond to $A_2$ of FIG. 6. The summer 819 may subtract the absolute value of the output corresponding to the in-phase component of the third additional calculation circuit 850 from the third reference value (Ref[2]) and provide the result value to the comparator 821. Hence, the value received by the comparator 821 is obtained by subtracting the absolute value of the output of the additional calculation circuit in the previous step from the reference value corresponding to the additional calculation circuit in the current step, and has the same form as the replacement value in Equation 8. The comparator 821 may output 0 if the received value is greater than 0 and 1 if the value is less than 0 as outb[6].

The summer 820 may receive absolute values of outputs corresponding to the third reference value Ref[2] and the quadrature phase component of the third additional calculation circuit 850, respectively. The summer 820 may subtract the absolute value of the output corresponding to the quadrature phase component of the third additional calculation circuit 850 from the third reference value Ref[2], and provide the result value to the comparator 822. The comparator 822 may output 0 if the received value is greater than 0, and 1 if it is less than 0 as outb[7].

The fifth additional calculation circuit 870 may output least significant bits $b_8$ and $b_9$ of each of the in-phase component and the quadrature phase component. The least significant bit $b_8$ of the in-phase component may correspond to outb[8], and the least significant bit $b_9$ of the quadrature phase component may correspond to outb[9]. To this end, the fifth additional calculation circuit 870 may include two absolute value returning functions 823 and 824, two summers 825 and 826, and two comparators 827 and 828.

The summer 825 may receive absolute values of outputs corresponding to the fourth reference value Ref[3] and the in-phase component of the fourth additional calculation circuit 860, respectively. The fourth reference value Ref[3] may correspond to $A_3$ of FIG. 6. The summer 825 may subtract the absolute value of the output corresponding to the in-phase component of the fourth additional calculation circuit 860 from the fourth reference value Ref[3] and provide the result value to the comparator 827. That is, the value received by the comparator 827 is obtained by subtracting the absolute value of the output of the additional calculation circuit in the previous step from the reference value corresponding to the additional calculation circuit in the current step, and has the same form as the replacement value in Equation 8. The comparator 827 may output 0 if the received value is greater than 0, and 1 if it is less than 0 as outb[8].

The summer 826 may receive absolute values of outputs corresponding to the fourth reference value Ref[3] and the quadrature phase component of the fourth additional calculation circuit 860, respectively. The summer 826 may subtract the absolute value of the output corresponding to the quadrature phase component of the fourth additional calculation circuit 860 from the fourth reference value Ref[3] and provide the result value to the comparator 828. The comparator 828 may output 0 if the received value is greater than 0 and 1 if the received value is less than 0 as outb[9].

Referring to FIG. 8 according to the embodiment described above, the hard detector may be implemented using only multi-stage additional calculation circuits. However, each input value from the second additional calculation circuit 840 to the fifth additional calculation circuit 870 may be obtained only when the summing operation of the additional calculation circuit corresponding to the previous step is completed. For example, the third additional calculation circuit 850 should receive the output of the summer 807 of the second additional calculation circuit 840 to calculate the value for determining the bit in the comparator 815. Therefore, when implementing a hard detector with only multi-stage additional calculation circuits according to FIG. 8, there is an advantage of reducing the number of comparators included in the hard detector, as well as reducing the number of reference values that are generated and supplied to the comparators. Meanwhile, the concept of FIG. 8, in which an additional calculation circuit is utilized at every stage and the number of conventional comparators is reduced accordingly, can be equally applied to QAM demodulators of other orders. For instance, for a 256 QAM demodulator, the circuitry of FIG. 8 can be modified by omitting the fifth additional calculation circuit 870; and for a 4K QAM demodulator, a sixth additional calculation circuit (not shown) may be added in series following the fifth additional calculation circuit 870.

Figure 9:
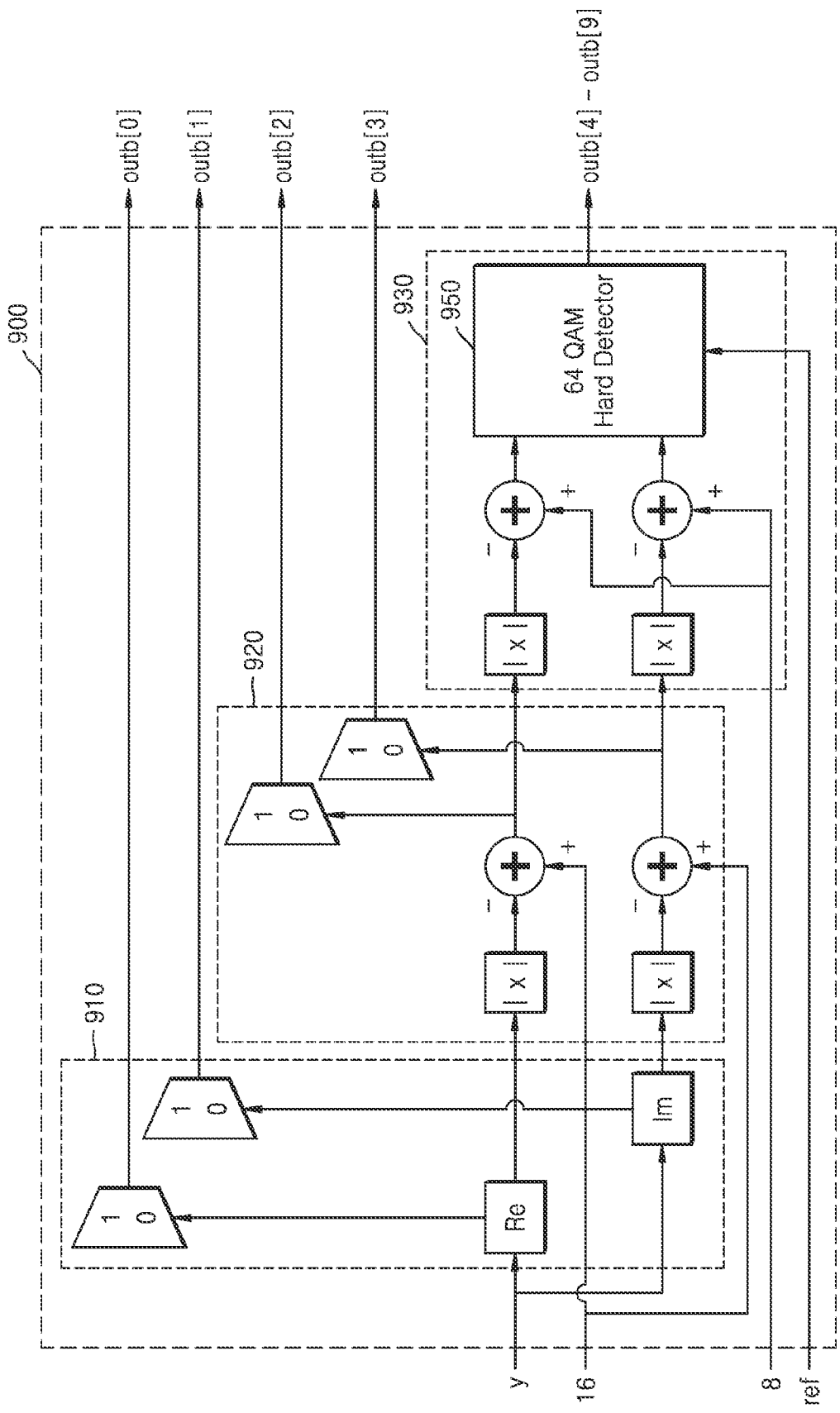
FIG. 9 illustrates another example of a 1024 QAM demodulator based on sequential serial operation according to an embodiment.

FIG. 9 illustrates another example of a 1024 QAM demodulator based on sequential serial operation according to an embodiment. Description previously given with reference to FIG. 8 may be omitted.

Referring to FIG. 9, a hard detector 900 may include multi-stage additional calculation circuits. For example, the hard detector 900 corresponds to a 1024 QAM demodulator and may include second additional second-stage calculation circuits (for example, a first additional calculation circuit 910 and a second additional calculation circuit 920) and a lower-level hard detector 950 of a 256 QAM demodulator.

The first additional calculation circuit 910 and the second additional calculation circuit 920 may be respectively the same circuit as the first additional calculation circuit 830 and the second additional calculation circuit 840 of FIG. 8. The remaining circuit 930 may be equivalent circuits of the third additional calculation circuit 850 to the fifth additional calculation circuit 870 of FIG. 8. That is, the remaining circuit 930 may further include the 64 QAM hard detector 950, two absolute value returning functions for calculating input values to the 64 QAM hard detector 950, and two summers.

According to various embodiments, the desired performance requirements of the reception device 200 may be determinative of an implementation form of the hard detector considering an operating clock, power consumption, hardware complexity, and the like. For example, in the case of the reception device 200 having a high operating clock speed and a stringent (short) delay time requirement, the hard detector may calculate a real part and an imaginary part in parallel using a binary operation according to an existing decision boundary method. However, in the case of using the decision boundary method, as the modulation order increases, the number of required comparators increases rapidly, and accordingly, the hardware size increases and power consumption increases. As another example, in the case of the reception device 200 having a low operating clock and a longer (more relaxed) delay time requirement, the hard detector may be implemented with a lower-level hard detector 750 and a additional calculation circuit 760 according to FIG. 7A. In this case, apart from the delay time caused by the additional calculation circuit 760 of the single stage, the number of comparators used for the hard detector may be reduced, and accordingly, power consumption and hardware size may be improved.

As another example, when the delay time requirement is even longer (further relaxed) such that the delay time barely needs to be considered, the hard detector may be implemented with only multi-stage additional calculation circuits, such as the hard detector 800 of FIG. 8. The hard detector 800 of FIG. 8 may have a longer delay than the hard detector 700 of FIG. 7A, but the number of comparators may be further reduced, thereby reducing the hardware size and further improving power consumption.

FIG. 10 is a table showing a comparison of the numbers of comparators, reference values, and summers according to an implementation example of a hard detector according to an embodiment.

Referring to the table of FIG. 10, the number of comparators, the number of reference values, and the number of summers of the hard detector according to various embodiments are shown.

The existing decision boundary-based demodulator of 1024 QAM requires 16 reference values to distinguish between constellation coordinates on the constellation map, and it may be seen that 32 comparators are required because each comparison is performed between the real part and the imaginary part.

In the case of implementing a 1024 QAM demodulator with the hard detector 700 of FIG. 7A, since the additional calculation circuit 760 first determines the most significant bits of each of the in-phase component and the quadrature phase component, reference values for identifying constellation coordinates in one quadrant on a constellation of 1024 QAM are required. Thus, since the hard detector 700 of FIG. 7A only needs to add one reference of "0" to the number of reference values of the 256 QAM demodulator, in conclusion, it may be seen that only 9 reference values are required. Therefore, since the hard detector 700 of FIG. 7A performs comparison in the real part and the imaginary part using 9 reference values, it may be seen that only 18 comparators are sufficient. Additionally, when only the most significant bits of the in-phase component and the quadrature phase component are separately determined as in the hard detector 700 of FIG. 7A, the number of summers required is always two regardless of the QAM modulation order.

In the case of implementing a 1024 QAM demodulator with the hard detector 800 of FIG. 8, since the additional calculation circuit 760 sequentially determines from the most significant bit to the least significant bit of each of the in-phase component and the quadrature phase component, five reference values are required on the constellation of 1024 QAM. For example, the most significant bits of each of the in-phase component and the quadrature phase component may be determined with a reference value of "0", and since the remaining 8 bits only need to be compared sequentially 4 times, it may be seen that 4+1=5 reference values are required. Therefore, since the hard detector 800 of FIG. 8 performs comparison on the real part and the imaginary part using 5 reference values, it may be seen that only 10 comparators are sufficient. Additionally, when sequentially determining from the most significant bit to the least significant bit as in the hard detector 800 of FIG. 8, it may be seen that 8 summers are employed because 2 summers are used for each decision step of the remaining bits except for the most significant bit. Therefore, both the hard detector 700 of FIG. 7A and the hard detector 800 of FIG. 8 may be implemented using fewer comparators than the hard detector of the conventional decision boundary method.

Figure 11:
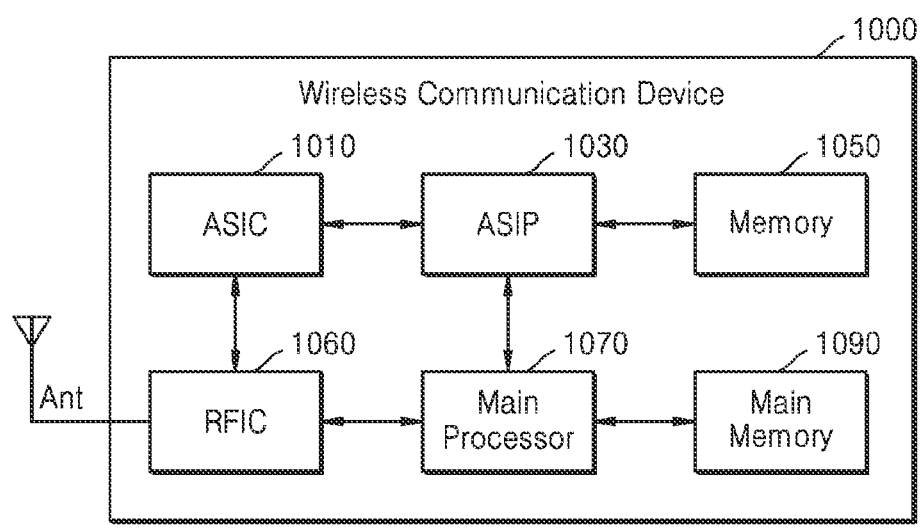
FIG. 11 is a block diagram of a wireless communication device according to an embodiment.

FIG. 11 is a block diagram of a wireless communication device according to an embodiment.

Referring to FIG. 11, a wireless communication device 1000 may include a modem (MODEM) (not shown) and a radio frequency integrated circuit (RFIC) 1060, and the modem may include an ASIC 1010, an application specific instruction set processor (ASIP) 1030, a memory 1050, a main processor 1070, and a main memory 1090. The wireless communication device 1000 of FIG. 11 may be the wireless communication device 10 according to an embodiment.

The RFIC 1060 is connected to an antenna Ant and may receive a signal from the outside or transmit a signal to the outside using a wireless communication network. The ASIP 1030 is an integrated circuit customized for a certain purpose, and may support a dedicated instruction set for a certain application and execute instructions included in the instruction set. The memory 1050 may communicate with the ASIP 1030 and may store a plurality of instructions executed by the ASIP 1030 as non-transitory storage. For example, the memory 1050 may include any type of memory accessible by the ASIP 1030, as a non-limiting example, such as random access memory (RAM), read only memory (ROM), tape, magnetic disks, optical disks, volatile memory, non-volatile memory, and combinations thereof.

The main processor 1070 may control the wireless communication device 1000 by executing a plurality of instructions. For example, the main processor 1070 may control the ASIC 1010 and the ASIP 1030, process data received through a wireless communication network, or process a user's input to the wireless communication device 1000.

The main memory 1090 may communicate with the main processor 1070 and may store a plurality of instructions executed by the main processor 1070 as a non-temporary storage device. For example, the main memory 1090 may include any type of memory accessible by the main processor 1070, as a non-limiting example, such as RAM, ROM, tape, magnetic disks, optical disks, volatile memory, non-volatile memory, and combinations thereof.

While the inventive concept has been particularly shown and described with reference to embodiments thereof, it will be understood that various changes in form and details may be made therein without departing from the spirit and scope of the following claims.

What is claimed is:

1. A Quadrature Amplitude Modulation (QAM) demodulator comprising:
    a first calculation circuit including:
        a real part returning circuit and an imaginary part returning circuit configured to derive, from a first complex symbol, an in-phase (I) component and a quadrature phase (Q) component, respectively;
        a first comparator and a second comparator for receiving the I and Q components, respectively, and based thereon, outputting respective bits of a bit string;
    a first absolute value returning circuit configured to derive an absolute value of the I component "abs(I)";
    a second absolute value returning circuit configured to derive an absolute value of the Q component "abs(Q)";
    a first summer configured to sum abs(I) and a first reference value and thereby provide a first summed output;
    a second summer configured to sum abs(Q) and the first reference value and thereby provide a second summed output; and
    a sub-QAM demodulator configured to QAM demodulate a second complex symbol and thereby output corresponding bits, wherein an I component of the second complex symbol is based on the first summed output and a Q component of the second complex symbol is based on the second summed output, and the corresponding bits are remaining bits of the bit stream.

2. The QAM demodulator of claim 1, wherein a modulation order of the QAM demodulator is $2^{2N}$, a modulation order of the sub-QAM demodulator is $2^{2(N-1)}$, the first reference value is $2^{N-1}$, and N is a natural number.

3. The QAM demodulator of claim 1, wherein the first comparator outputs a most significant bit (MSB) of an in-phase component of a bit string corresponding to the first complex symbol,
    wherein the MSB of the in-phase component is 0 when a real part of the first complex symbol is greater than 0, and is 1 when the real part of the first complex symbol is less than 0.

4. The QAM demodulator of claim 3, wherein the second comparator outputs a MSB of a quadrature phase component in a bit string corresponding to the first complex symbol,
    wherein the MSB of the quadrature phase component is 0 when the imaginary part of the first complex symbol is greater than 0 and is 1 when the imaginary part of the first complex symbol is less than 0.

5. The QAM demodulator of claim 4, wherein the sub-QAM demodulator outputs remaining bits except for the MSB of the in-phase component and the MSB of the quadrature phase component in the bit string corresponding to the first complex symbol.

6. The QAM demodulator of claim 1, wherein the first summer subtracts abs(I) from the first reference value, and provides a result of the subtraction to the sub-QAM demodulator.

7. The QAM demodulator of claim 6, wherein the second summer subtracts abs(Q) from the first reference value, and provides a result of the subtraction to the sub-QAM demodulator.

8. A Quadrature Amplitude Modulation (QAM) demodulator comprising:
    a most significant bit (MSB) calculation circuit including:
        a real part returning circuit and an imaginary part returning circuit that each receive a complex symbol; a real number comparator; and an imaginary number comparator; and
    a plurality of calculation circuits connected in series with each other,
    wherein each of the plurality of calculation circuits comprises: a first absolute value returning circuit, a first summer, and a first comparator for sequentially outputting bits associated with an in-phase (I) component of the complex symbol except for a most significant bit (MSB) and a next MSB of a bit string corresponding to the complex symbol; and a second absolute value returning circuit, a second summer, and a second comparator for sequentially outputting bits associated with a quadrature phase (Q) component of the complex symbol except for the MSB and the next MSB of the bit string.

9. The QAM demodulator of claim 8, wherein, when a modulation order of the QAM demodulator is $2^{2N}$, the number of calculation circuits is N−1, where N is a natural number.

10. The QAM demodulator of claim 8, wherein the real number comparator outputs an MSB associated with the I component of the bit string,
    wherein the MSB associated with the I component is 0 when a real part of the complex symbol is greater than 0 and is 1 when the real part of the complex symbol is less than 0.

11. The QAM demodulator of claim 10, wherein the imaginary number comparator outputs a MSB associated with the Q component in the bit string,
    wherein the MSB of the Q component is 0 when the imaginary part of the complex symbol is greater than 0 and is 1 when the imaginary part of the complex symbol is less than 0.

12. The QAM demodulator of claim 8, wherein the plurality of calculation circuits comprise a first calculation circuit connected to the MSB calculation circuit, wherein, in the first calculation circuit, the first summer outputs a subtraction of the absolute value of the output of the real part returning circuit from a first reference value, and outputs a first bit having a value of 0 if the result of the subtraction is greater than 0 and a value of 1 if the result of the subtraction is less than 0, and the second summer outputs a subtraction of the absolute value of the output of the imaginary part returning circuit from the first reference value, and outputs a second bit having a value of 0 if the result of the subtraction is greater than 0 and a value of 1 if the result of the subtraction is less than 0, wherein the first bit corresponds to a next order bit of the MSB of the I component in the bit string of the complex symbol, wherein the second bit corresponds to the next order bit of the MSB of the Q component in the bit string of the complex symbol, wherein the first reference value is $2^{N-1}$, where N is a natural number.

13. The QAM demodulator of claim 12, wherein the plurality of calculation circuits comprise a second calculation circuit connected to the first calculation circuit, wherein the second calculation circuit subtracts the absolute value of the output of the first summer from a second reference value and outputs a third bit having a value of 0 if the result of the subtraction is greater than 0 and a value of 1 if the result of the subtraction is less than 0, and subtracts the absolute value of the output of the second summer from the second reference value and outputs a fourth bit having a value of 0 if the result of the subtraction is greater than 0 and a value of 1 if the result of the subtraction is less than 0, wherein the third bit corresponds to the next order bit of the first bit in the bit string of the I component, wherein the fourth bit corresponds to the next order bit of the second bit in the bit string of the Q component, wherein the second reference value is $2^{N-2}$.

14. A Multiple-Input and Multiple-Output (MIMO) detector comprising a plurality of soft decision calculation circuits, wherein each of the plurality of soft decision calculation circuits comprises hard decision circuits, wherein each of the hard decision circuits comprises a real part returning circuit and an imaginary part returning circuit for receiving complex symbols, respectively, a first calculation circuit including a first comparator and a second comparator, a first absolute value returning circuit for receiving an output value of the real part returning circuit, a second absolute value returning circuit for receiving an output value of the imaginary part returning circuit, a first summer providing a first summer output based on the output of the first absolute value returning circuit and a first reference value, a second summer providing a second summer output based on the output of the second absolute value returning circuit and the first reference value, and a sub-hard decision circuit receiving an output of the first summer and the second summer output.

15. The MIMO detector of claim 14, wherein a Quadrature Amplitude Modulation (QAM) modulation order of each of the hard decision circuits is $2^{2N}$, a QAM modulation order of the sub-hard decision circuit is $2^{2(N-1)}$, the first reference value is $2^{N-1}$, and N is a natural number.

16. The MIMO detector of claim 15, wherein the first comparator outputs the most significant bit of an in-phase component of a bit string corresponding to the complex symbol, wherein the most significant bit of the in-phase component is 0 when the real part of the complex symbol is greater than 0, and is 1 when the real part of the complex symbol is less than 0.

17. The MIMO detector of claim 16, wherein the second comparator outputs the most significant bit of a quadrature phase component in a bit string corresponding to the complex symbol, wherein the most significant bit of the quadrature phase component is 0 when the imaginary part of the complex symbol is greater than 0 and is 1 when the imaginary part of the complex symbol is less than 0.

18. The MIMO detector of claim 17, wherein sub-hard decision circuit outputs the remaining bits except for the most significant bit of the in-phase component and the most significant bit of the quadrature phase component among the bit strings corresponding to the complex symbols.

19. The MIMO detector of claim 14, wherein the first summer subtracts the output of the first absolute value returning circuit from the first reference value, and provides a result of the subtraction to the sub-hard decision circuit.

20. The MIMO detector of claim 19, wherein the second summer subtracts the output of the second absolute value returning circuit from the first reference value, and provides a result of the subtraction to the sub-hard decision circuit.

* * * * *